US012713241B2

(12) United States Patent
Shreevastav et al.

(10) Patent No.: US 12,713,241 B2
(45) Date of Patent: Aug. 18, 2026

(54) SECURE TRANSFER OF POSITIONING INTEGRITY KPI

(71) Applicant: TELEFONAKTIEBOLAGET LM ERICSSON (PUBL), Stockholm (SE)

(72) Inventors: Ritesh Shreevastav, Upplands Väsby (SE); Sara Modarres Razavi, Stockholm (SE); Iana Siomina, Täby (SE); Deep Shrestha, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 323 days.

(21) Appl. No.: 18/012,310

(22) PCT Filed: Jun. 23, 2021

(86) PCT No.: PCT/IB2021/055575
§ 371 (c)(1),
(2) Date: Dec. 22, 2022

(87) PCT Pub. No.: WO2021/260599
PCT Pub. Date: Dec. 30, 2021

(65) Prior Publication Data

US 2023/0328525 A1 Oct. 12, 2023

Related U.S. Application Data

(60) Provisional application No. 63/042,798, filed on Jun. 23, 2020.

(51) Int. Cl.
*H04W 24/00* (2009.01)
*H04W 12/037* (2021.01)
(Continued)

(52) U.S. Cl.
CPC ....... *H04W 12/104* (2021.01); *H04W 12/037* (2021.01); *H04W 12/041* (2021.01); *H04W 12/106* (2021.01); *H04W 12/63* (2021.01)

(58) Field of Classification Search
CPC ........ G01S 19/252; G01S 5/02; G01S 5/0244; G01S 5/0295; H04W 4/029;
(Continued)

(56) References Cited

U.S. PATENT DOCUMENTS

2016/0029162 A1 1/2016 Edge et al.
2020/0015076 A1 * 1/2020 Vamanan .............. H04W 12/72
(Continued)

FOREIGN PATENT DOCUMENTS

CN 110622587 12/2019
WO 2019125246 A1 6/2019
(Continued)

OTHER PUBLICATIONS

Catt, et al., "Revised SID: Study on NR Positioning Enhancements", 3GPP TSG RAN Meeting #88e, RP-200928, Electronic Meeting, Jun. 29-Jul. 3, 2020.
(Continued)

*Primary Examiner* — Shantell L Heiber
(74) *Attorney, Agent, or Firm* — Ericsson Inc.

(57) ABSTRACT

Systems and methods for managing the secure transmission of positioning integrity KPIs and associated information are provided. A network node provides a key configured to decode positioning integrity assistance information. A wireless device can receive encrypted positioning integrity assistance information and use the key to decrypt the information and perform positioning method(s) in accordance with the decrypted positioning integrity assistance information.

22 Claims, 12 Drawing Sheets

(51) Int. Cl.

| | |
|---|---|
| ***H04W 12/041*** | (2021.01) |
| ***H04W 12/104*** | (2021.01) |
| ***H04W 12/106*** | (2021.01) |
| ***H04W 12/63*** | (2021.01) |

(58) Field of Classification Search

CPC ............. H04W 12/037; H04W 12/041; H04W 12/104; H04W 12/63; H04W 4/02; H04W 12/106

See application file for complete search history.

(56) References Cited

U.S. PATENT DOCUMENTS

| | | | | |
|---|---|---|---|---|
| 2020/0053690 | A1* | 2/2020 | Fischer | G01S 5/0236 |
| 2021/0160810 | A1* | 5/2021 | Zhang | G01S 5/10 |
| 2021/0235264 | A1* | 7/2021 | Kolekar | H04W 12/04 |
| 2021/0368296 | A1* | 11/2021 | Sharma | H04W 4/029 |

FOREIGN PATENT DOCUMENTS

| | | | |
|---|---|---|---|
| WO | 2019160465 | A1 | 8/2019 |
| WO | 2019245234 | A1 | 12/2019 |

OTHER PUBLICATIONS

International Search Report and Written Opinion issued on Sep. 30, 2021 for Applicant's corresponding International PCT Application No. PCT/IB2021/055575.

ISO 26262, Road vehicles—Functional safety, International Organization for Standardization https://www.iso.org/obp/ui/en/#iso:std:iso:26262:-1:ed-2:v1:en.

RTCA DO 229, Minimum Operational Performance Standards (MOPS) for Global Positioning System/Satellite-Based Augmentation System Airborne Equipment https://standards.globalspec.com/std/14281994/rtca-do-229.

Rejection Decision for Chinese Application No. 202180044879.8, Sep. 19, 2025, 11 pages.

* cited by examiner

SECURE TRANSFER OF POSITIONING INTEGRITY KPI

CROSS REFERENCE TO RELATED APPLICATIONS

This application claims the benefit of U.S. Provisional Application No. 63/042,798 filed on Jun. 23, 2020, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Positioning and location services have been topics in LTE standardization since 3GPP Release 9. An objective was to fulfill regulatory requirements for emergency call positioning. Positioning in NR is proposed to be supported by the example architecture shown in FIG. 1. LMF 130A represents the location management function entity in NR. There are also interactions between the LMF 130A and the gNodeB 120 via the NRPPa protocol. The interactions between the gNodeB 120 and the device (UE) 110 are supported via the Radio Resource Control (RRC) protocol. Other network nodes, such as Access and Mobility Management Function (AMF) 130B and evolved Serving Mobile Location Center (e-SMLC) 130C, may be involved in positioning support.

Note 1: The gNB 120B and ng-eNB 120A may not always both be present.

Note 2: When both the gNB 120B and ng-eNB 120A are present, the NG-C interface is only present for one of them.

In the legacy LTE standards, the following techniques are supported:

Enhanced Cell ID. Essentially cell ID information to associate the device to the serving area of a serving cell, and then additional information to determine a finer granularity position.

Assisted GNSS. GNSS information retrieved by the device, supported by assistance information provided to the device from E-SMLC OTDOA (Observed Time Difference of Arrival). The device estimates the time difference of reference signals from different base stations and sends to the E-SMLC for multilateration.

UTDOA (Uplink TDOA). The device is requested to transmit a specific waveform that is detected by multiple location measurement units (e.g. an eNB) at known positions. These measurements are forwarded to E-SMLC for multilateration.

Sensor methods such as biometric pressure sensor which provides vertical position of the device and Inertial Motion Unit (IMU) which provides displacement.

The NR positioning for Release 16, based on the 3GPP NR radio-technology, is positioned to provide added value in terms of enhanced location capabilities. The operation in low and high frequency bands (i.e. below and above 6 GHz) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA and UTDOA, Cell-ID or E-Cell-ID etc., utilizing timing measurements to locate a UE. These methods are being standardized for NR in Release 15 (limited functionality) and Release 16 and planned to be enhanced in Release 17.

Positioning modes can be categorized in the following three areas:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own without network assistance.

FIG. 2 illustrates an example LTE Positioning Protocol (LPP) Assistance Data transfer procedure. The positioning techniques can be supported by assistance data from the location server to the UE. Typically, the UE 110 either requests (message 1) and the location server 130 provides assistance data (message 2) as a response, or alternatively the location server 130 can provide assistance data unsolicited (message 3).

Recent enhancements in Global Navigation Satellite System(s) (GNSS) technology include support for very precise positioning, where the device can interact with a network node to obtain specific measurement correction information. One example is Real Time Kinematic (RTK) GNSS, which is a differential GNSS positioning technology enabling positioning accuracy improvement from meter level to decimeter or even centimeter level in the right conditions in real-time by exploiting the carrier phase of the GNSS signal rather than only the code phase. The support for RTK in LTE networks comprises reporting RTK correction data to the UE. Two versions of reporting RTK data to the UE have been standardized in Release 15. The first method is to broadcast the information from base stations by extending the system information bits. The second method is to send the information to each UE individually, for example via LPP. In addition, the UE can also interact with an RTK server over the application layer directly.

Further, as the number of UEs supporting network-assisted positioning increases, broadcasting of assistance data to the UEs may help to reduce signaling load, as well as supporting geofencing of broadcast warning messages, for example.

Until now, accuracy has been the primary positioning performance metric which has been discussed and supported in 3GPP. Emerging applications relying on high-precision positioning technology in autonomous applications (e.g. automotive) have brought with them the need for higher integrity and reliability in addition to high accuracy. The 5G service requirements specified in 3GPP TS 22.261 include the need to determine the reliability, and the uncertainty or confidence level, of the position-related data.

In RP-193237, a SI on "New SID on NR Positioning Enhancements" has been discussed in which one of the objectives is to:

Study solutions necessary to support integrity and reliability of assistance data and position information: [RAN2]
- Identify positioning integrity KPIs and relevant use cases.
- Identify the error sources, threat models, occurrence rates and failure modes requiring positioning integrity validation and reporting.
- Study methodologies for network-assisted and UE-assisted integrity.

Integrity is referred to as the measure of trust that can be placed in the correctness of information supplied by a navigation system. Integrity includes the ability of a system to provide timely warnings to user receivers in case of failure. Example of a failure can be taken from a RAT independent positioning method such as Assisted GNSS: If a satellite is malfunctioning, it should be detected by the system and the user should be informed to not use this satellite.

There are many aspects which may result in failure, for example:
- Environmental aspects: local incidents such as fire or traffic accidents (including driverless cars) or extreme weather conditions, or large area impacts such as tsunami or earthquakes, etc.
- Radio network aspects: Technical failure in location server, positioning signals transmission failure, availability and continuity failure of the service, etc.
- Technical service aspects: Position calculation failure, measurement failure, failure in integrity KPIs, etc.

Any use case related to positioning in Ultra Reliable Low Latency Communication (URLLC) typically requires high integrity performance. Example use cases include V2X, autonomous driving, UAV (drones), eHealth, rail and maritime, emergency and mission critical. In use cases in which large errors can lead to serious consequences such as wrong legal decisions or wrong charge computation, etc., the integrity reporting may become crucial.

FIG. 3 illustrates an example definition of accuracy, precision, validity, reliability and integrity. It can be assumed that "accuracy" is the same term as "validity" in positioning. Also, terms such as reliability, precision, certainty and confidence level can be used interchangeably. However, integrity requires the evaluation of both accuracy and reliability.

There are several example Integrity KPIs defined below that can help identify different integrity events:
- Alert Limit (AL): is the largest error allowable for safe operation.
- Time to Alert (TTA): is the maximum allowable elapsed time from the onset of a positioning failure until the equipment announces the alert.
- Integrity Risk (IR): is the maximum probability of providing a signal that is out of tolerance without warning the user in a given period of time.
- Protection Level (PL): is the statistical error bound computed to guarantee that the probability of the absolute position error exceeding the said number is smaller than or equal to the target integrity risk.

FIG. 4 illustrates an example Stanford plot in which the possible integrity operations and events can be explained in its different regions.

Nominal Operation is when the Position Error (PE) is less than the Protection Level (PL) which is less than the Alert Limit (AL) (e.g. PE<PL<AL).

System unavailable is when AL<PL.

Misleading Operation is when PL<PE.

Hazardously Operation is when PL<AL<PE.

Integrity Failure is an integrity event that lasts for longer than the TTA and with no alarm raised within the TTA.

Misleading Information (MI) is an integrity event occurring when, the system being declared available, the position error exceeds the protection level but not the alert limit.

Hazardously Misleading Information (HMI) is an integrity event occurring when, the system being declared available, the position error exceeds the alert limit.

In addition to integrity and accuracy, there are other performance metrics which can be considered for positioning service:

Continuity in time: The probability that the specified system performance will be maintained (e.g. no failure) for the duration (specific time interval) of a phase of operation, presuming that the system was available at the beginning of that phase of operation.

Continuity in space: e.g., within an area around the UE, can the same positioning service level/accuracy etc. be achieved in a closest surrounding area in case the UE is moving.

Availability: The percentage of time that the services of the system are usable by the navigator, which is an indication of the ability of the system to provide reliable information within the specified coverage area.

To ensure data security during its transmission over the air interface, ciphering of both user plane data and control plane data in the RRC layer and/or integrity protection which is used for control plane data only can be considered.

In general, the term "integrity protection" means that the receiver can verify that received message is the same message that the sender/transmitter sent. It is noted that the term "integrity protection" should be distinguished from "integrity" in the present disclosure.

Conventionally, an LPP session is used between a Location Server and the target device to obtain location related measurements or a location estimate or to transfer assistance data. Each LPP session comprises one or more LPP transactions, with each LPP transaction performing a single operation (capability exchange, assistance data transfer, or location information transfer). Each LPP transaction involves the exchange of one or more LPP messages between the location server and the target device. The general format of an LPP message consists of:

| Field | Role |
|---|---|
| Transaction ID | Identify messages belonging to the same transaction |
| Transaction End Flag | Indicate when a transaction (e.g. one with periodic responses) has ended |
| Sequence Number | Enable detection of a duplicate LPP message at a receiver |
| Acknowledgement | Enable an acknowledgement to be requested and/or returned for any LPP message |

Support for positioning integrity control remains to be determined.

SUMMARY

It is an object of the present disclosure to obviate or mitigate at least one disadvantage of the prior art.

There are provided systems and methods for managing the secure transfer/transmission of positioning integrity KPIs and associated information.

In a first aspect there is provided a method performed by a wireless device. The wireless device can comprise a radio interface and processing circuitry and be configured to receive a first key configured to decode positioning integrity assistance information. The wireless device receives encrypted positioning integrity assistance information and decrypts the encrypted positioning integrity assistance information using the key. The wireless device performs positioning measurements using the decrypted positioning integrity assistance information.

In some embodiments, the encrypted positioning integrity assistance information is received via a broadcast message.

In some embodiments, the encrypted positioning integrity assistance information is received via an LTE Positioning Protocol (LPP) message. The LPP message can include cyclic redundancy check (CRC) information associated with the positioning integrity assistance information. The wireless device can compute a cyclic redundancy check (CRC) on the encrypted positioning integrity assistance information.

In some embodiments, the wireless device further receives a non-encrypted part of the positioning integrity assistance information.

In some embodiments, responsive to detecting a cell change, the wireless device determines a validity of the first key. Responsive to determining that the first key is not valid, the wireless device can request a second key configured to decode positioning integrity assistance information.

In some embodiments, the wireless device can determine an estimated position of the wireless device and/or estimate an integrity level of the estimated position in accordance with the positioning integrity assistance information.

In some embodiments, the wireless device can transmit, to a network node, an estimated position of the wireless device and/or an integrity level associated with an estimated position of the wireless device.

In some embodiments, the positioning integrity assistance information is modified in accordance with at least one of: a different integrity level dependent on the type of positioning service, and a requirement of secure delivery of positioning integrity assistance information.

In another aspect there is provided a method performed by a network node. The network node can comprise a radio interface and processing circuitry and be configured to determine positioning integrity assistance information to be provided to a wireless device. The network node generates a first key configured to decode at least a part of the positioning integrity assistance information. The network node transmits the first key to the wireless device; and transmits encrypted positioning integrity assistance information to the wireless device.

In some embodiments, the first key is transmitted to the wireless device via a radio access node. In some embodiments, the encrypted positioning integrity assistance information is transmitted to the wireless device via a radio access node.

In some embodiments, responsive to detecting a cell change associated with the wireless device, the network node can determine a validity of the first key. Responsive to determining that the first key is not valid, the network node can provide a second key configured to decode positioning integrity assistance information.

In some embodiments, the network node receives an estimated position of the wireless device. In some embodiments, the network node receives an integrity level associated with an estimated position of the wireless device.

In some embodiments, the positioning integrity assistance information can be modified in accordance with at least one of: a different integrity level dependent on the type of positioning service, and a requirement of secure delivery of positioning integrity assistance information.

In another aspect there is provided a method performed by a network node. The network node can comprise a radio interface and processing circuitry and be configured to determine positioning integrity assistance information to be provided to a wireless device. The network node generates a Cyclic Redundancy Check (CRC) associated with at least a part of the positioning integrity assistance information. The network node transmits the CRC to the wireless device, and transmits the positioning integrity assistance information to the wireless device via an LTE Positioning Protocol (LPP) message.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
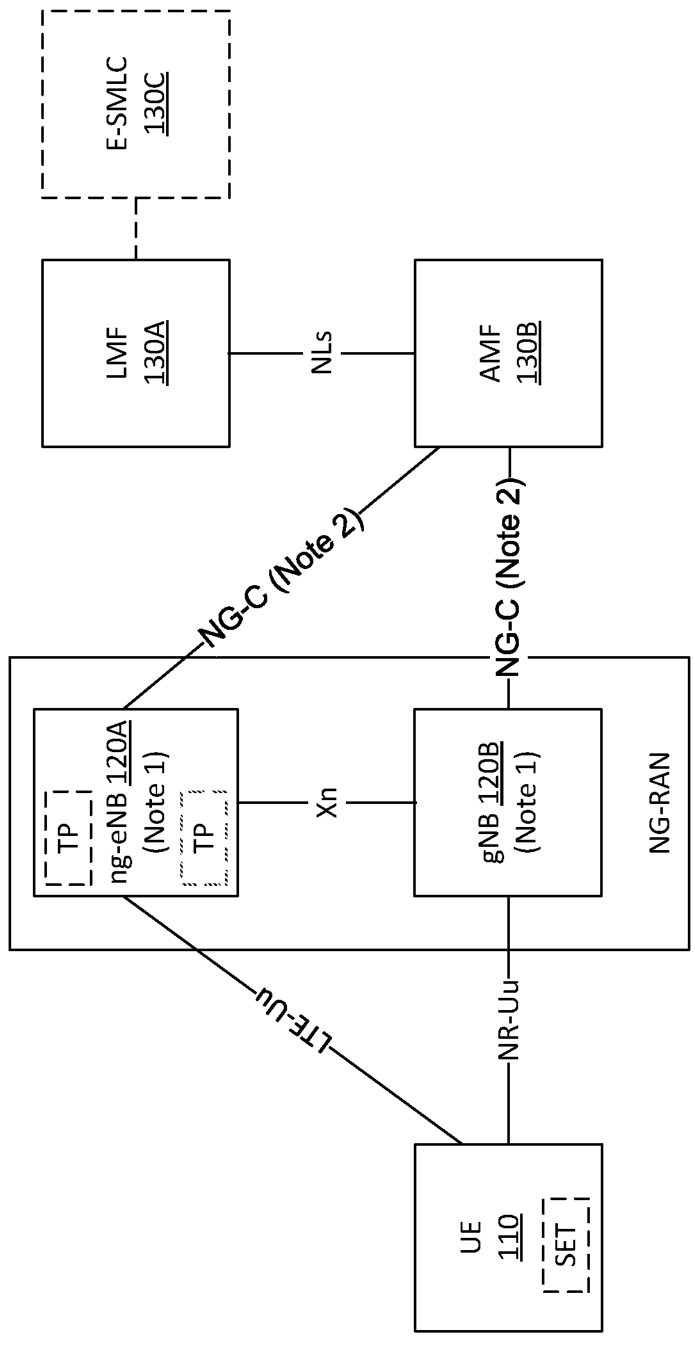
FIG. 1 illustrates an example of NR positioning architecture.
Figure 2:
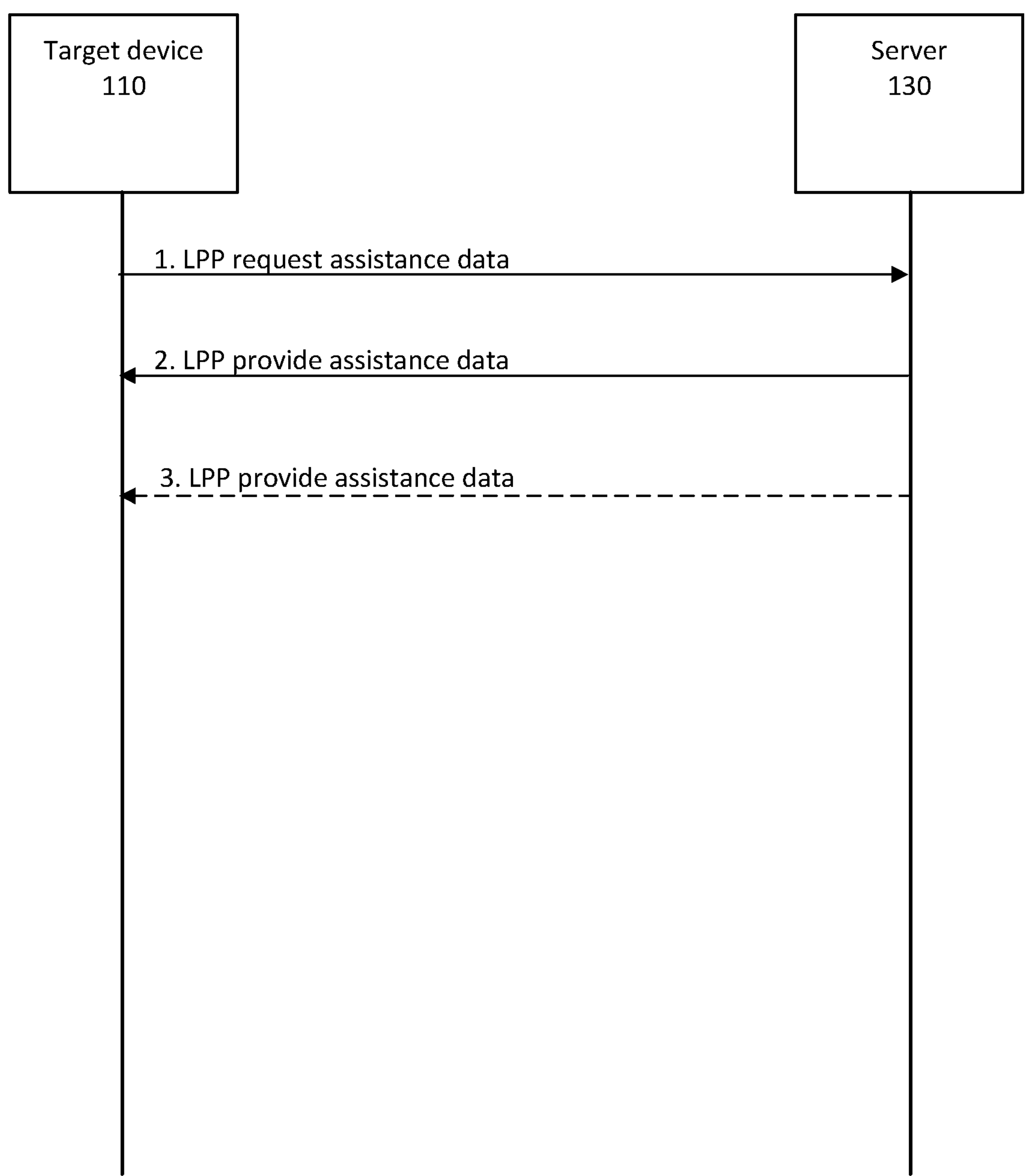
FIG. 2 illustrates an example of assistance data transfer.
Figure 3:
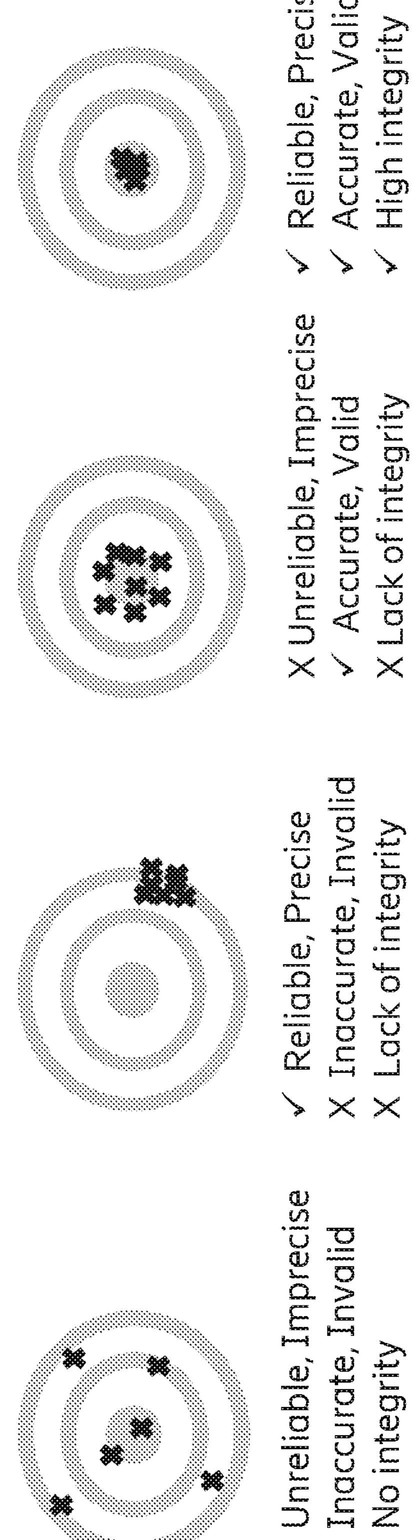
FIG. 3 illustrates an example definition of reliability, accuracy and integrity metrics.
Figure 4:
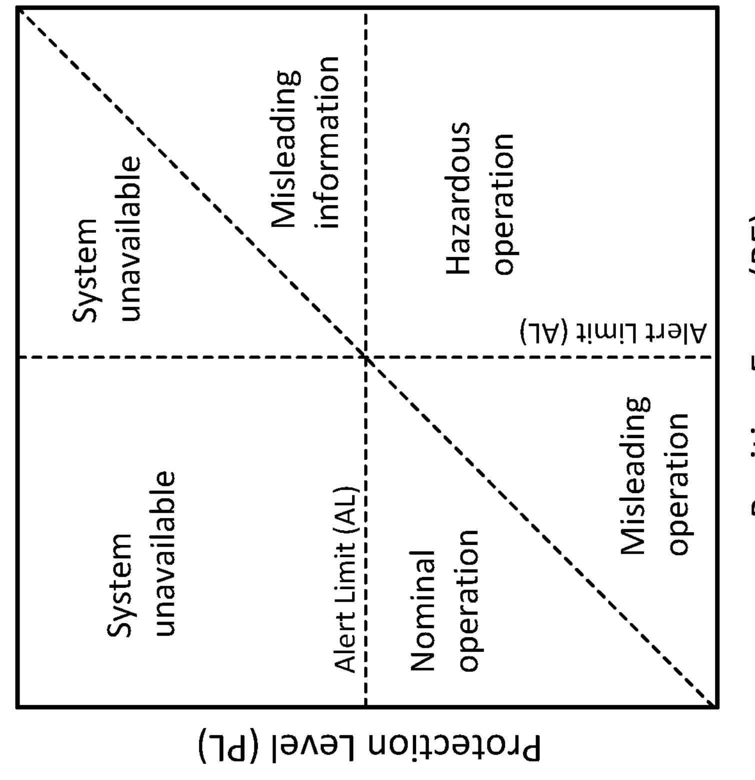
FIG. 4 is an example Stanford plot.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 9.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 11.

In some embodiments, the term "radio access technology" (RAT) refers to any RAT e.g. UTRA, E-UTRA, narrow band interne of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multicarrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

Figure 5A:
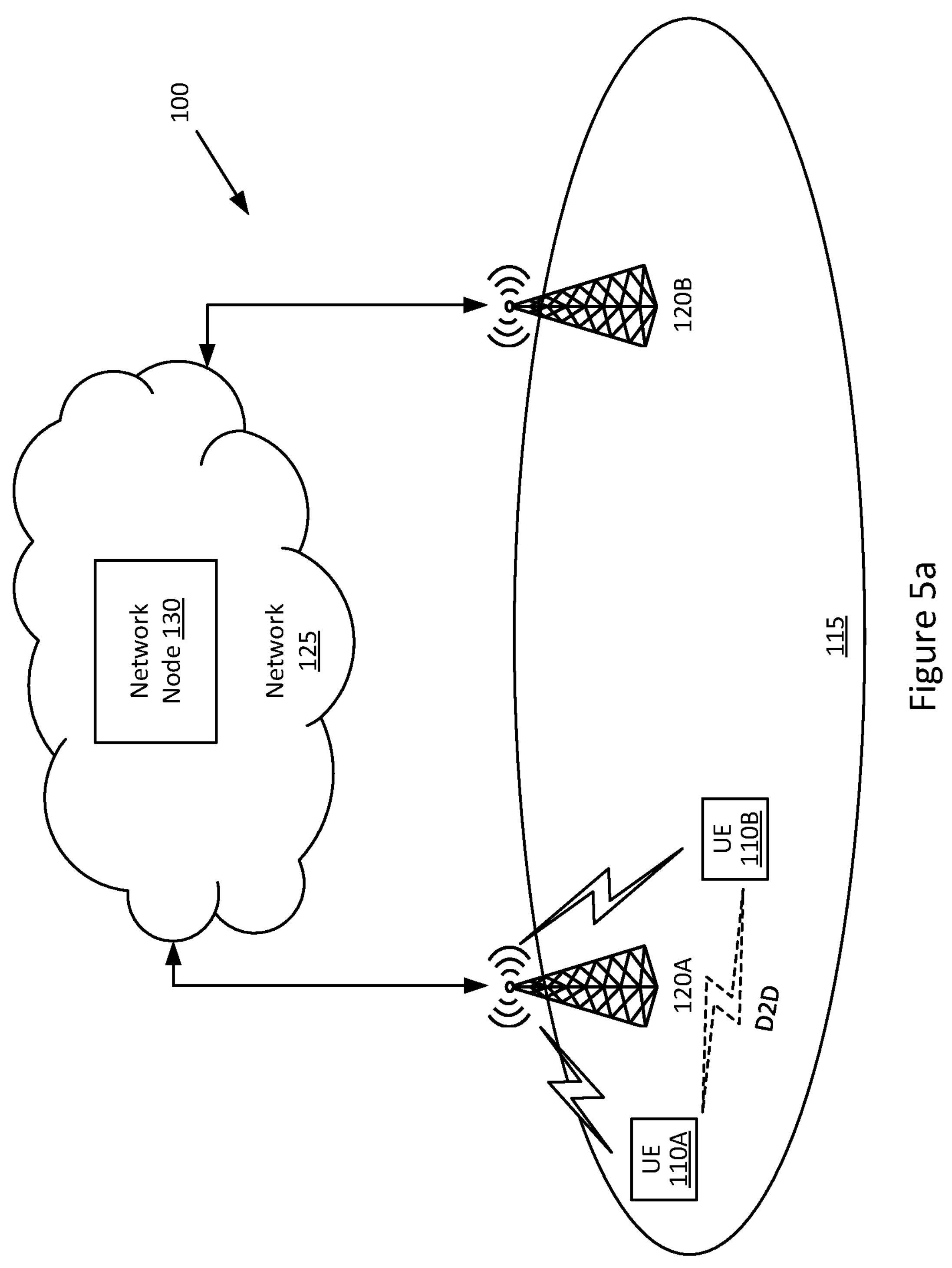
FIG. 5*a* illustrates an example wireless network.

FIG. 5*a* illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), location server node, MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 5B:
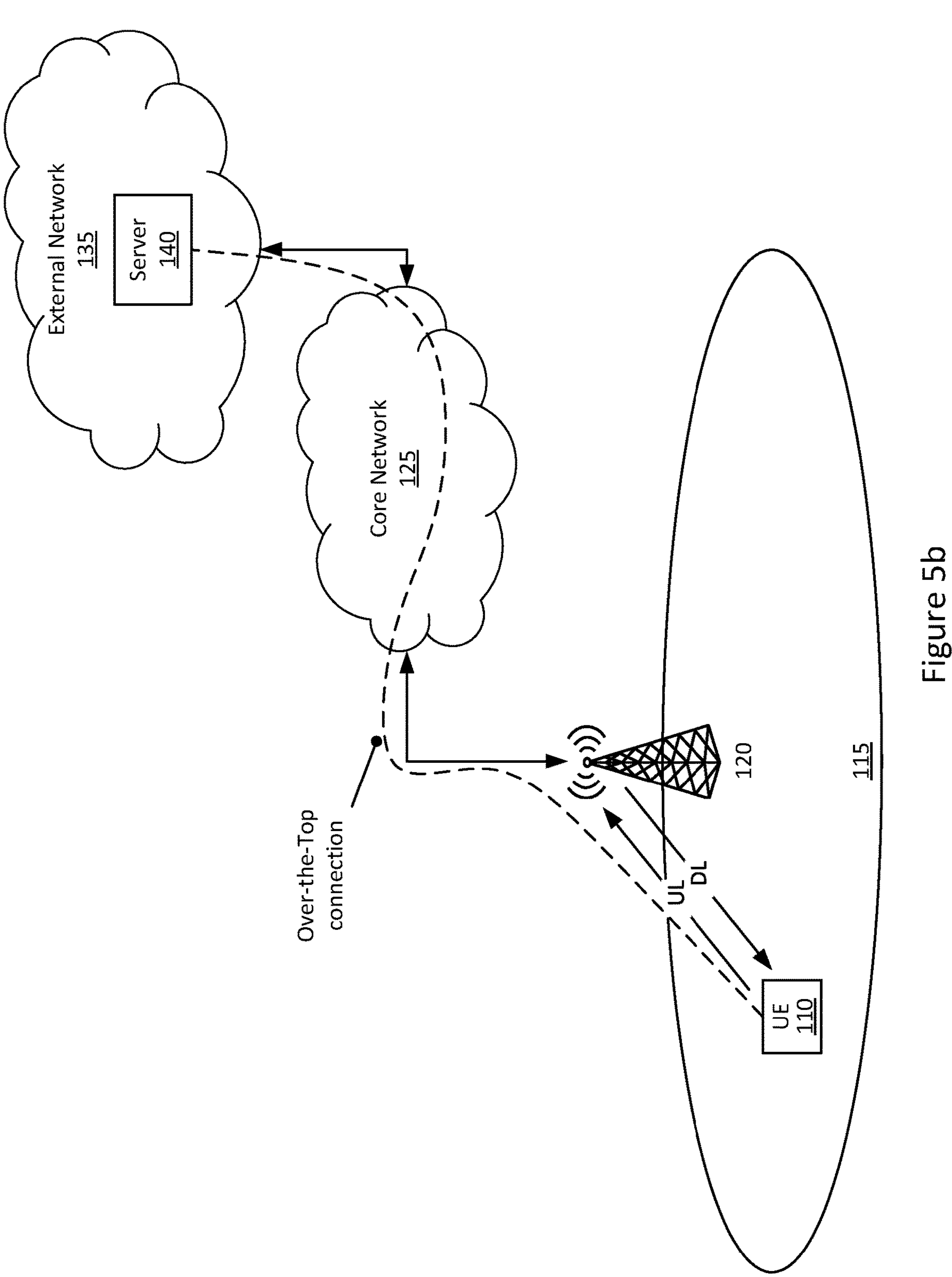
FIG. 5*b* illustrates an example of signaling in a wireless network.

FIG. 5*b* illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

Returning to positioning performance metrics, in the conventional positioning support of LTE and NR networks, there is no defined functionality or signaling support in the network or UE for positioning integrity control. Further, the UE is not capable of assessing its positioning estimation integrity. Different use cases require different level(s) of integrity. No integrity support has been specified so far in 3GPP for RAT dependent and independent positioning use cases. The integrity KPIs and the assistance information in this regard if needs to be broadcasted may be considered as sensitive information for a network and hence sharing this information may not be desired. There exists a need for classification for the UE in getting access to this information, otherwise there may be no business case for providing this information to the UE.

In general, in order for the UE and the network to assess the integrity of the positioning estimation, it is important that they first both have the same definitions and rules of how to set their integrity KPIs, and also to transfer this knowledge and the related parameters in an efficient manner. Embodiments described herein include methods for securely transferring positioning integrity KPIs.

Some embodiments include encryption of the broadcast data. The encryption keys can be sent to the UEs separately in order to enable them to decode the encrypted positioning data which is being broadcasted.

Some embodiments include data transfer via LPP. A secured LPP message transfer mechanism can be provided whereby the network and UE compute a cyclic redundancy check (CRC) and cross verify the message integrity with respect to the CRC.

Figure 6:
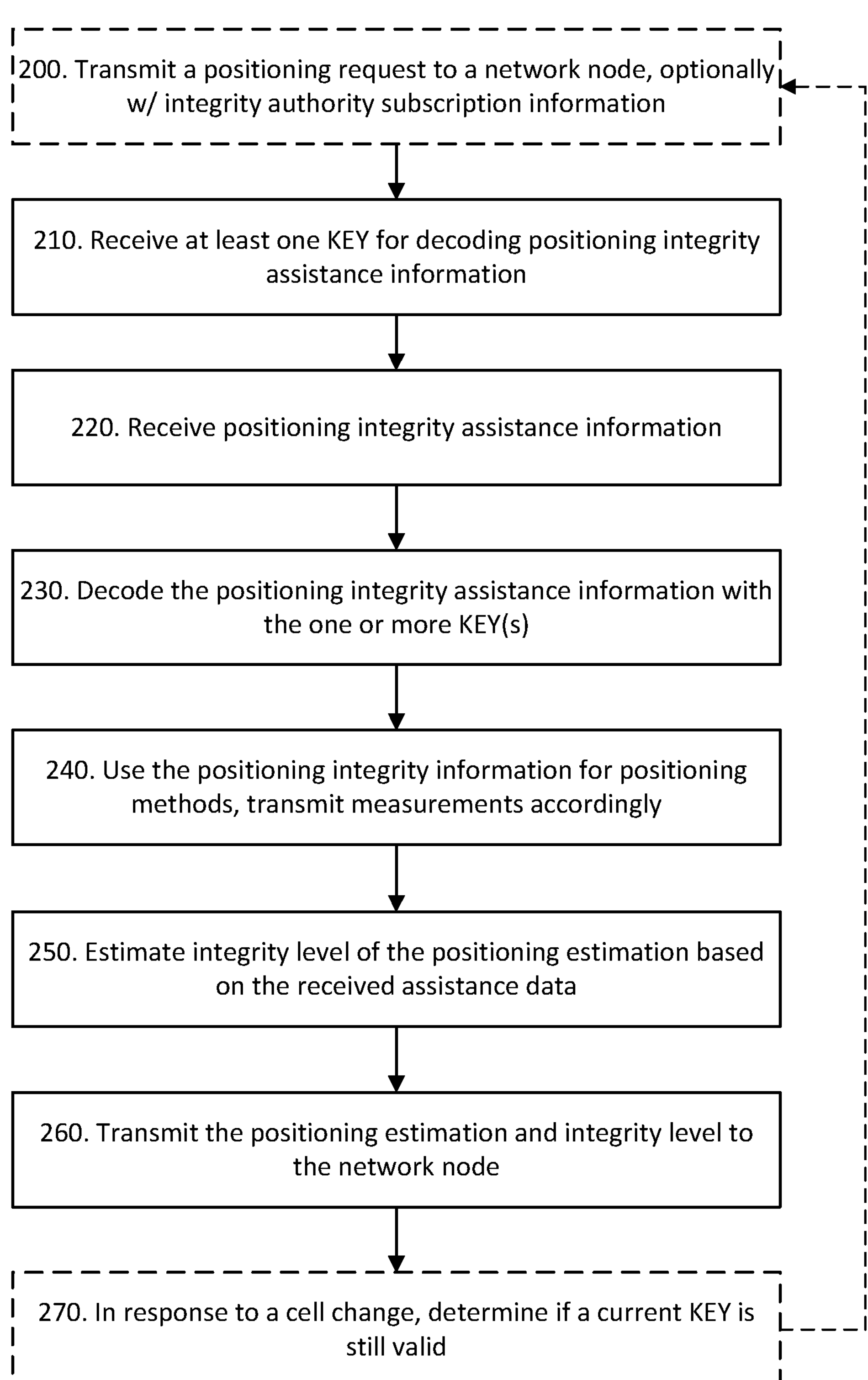
FIG. 6 is a flow chart illustrating a method which can be performed in a wireless device.

FIG. 6 is a flow chart illustrating a method which can be performed in a wireless device 110 (e.g. target device), such as a UE as described herein. The method can include:

Step 200: Optionally, the wireless device transmits a positioning request message to a network node, such as an access node or a location server. The request can include information associated with its integrity authorization subscription.

In step 200, alternatively or additionally, the wireless device can indicate its interest in receiving all or certain one or more parts or levels of the positioning integrity information. A list of the selectable parts or levels can be pre-defined or received from a network node.

Step 210: The wireless device receives at least one key configured to decode the positioning integrity assistance information.

Step 220: The wireless device listens for/receives the positioning integrity assistance information, at least a part of which is encrypted. The positioning integrity assistance information can be received via a broadcast message, a multicast message and/or a unicast message.

In some embodiments, a non-encrypted part of the positioning integrity information can be available to all wireless devices capable of receiving at least some positioning integrity information. Additionally, different groups of wireless devices may be able to receive different parts of the positioning integrity information, where each group is associated with the corresponding encryption/decryption key used by the devices to receive and decode the positioning integrity information intended for the group (e.g. group-specific positioning integrity information). The encryption key can be provided to the wireless device(s) via unicast signaling, e.g., LPP or RRC. One wireless device can be a part of one or more of such groups. Group-specific positioning integrity information can be further associated with group-specific time-frequency resources in which the devices which are a part of that group would be receiving the group-specific positioning integrity information.

Step 230: The wireless device decodes the positioning integrity information using its one or more available key(s).

Step 240: The wireless device can use the decoded positioning integrity information for one or more positioning methods such as performing positioning measurements to determine an estimated position of the wireless device. The wireless device can further transmit some measurement data and/or report(s).

Step 250: The wireless device can estimate the integrity level of the positioning estimation in accordance with the received assistance data.

Step 260: The wireless device transmits the positioning estimate and the integrity level to the network node (e.g. access node or location server). In some embodiments, the positioning estimate and integrity level can be transmitted to the network node that transmitted the request.

Step 270: In an optional embodiment, responsive to a cell change, the wireless device can determine/verify the validity of the current key(s). For example, the wireless device can determine if a key is valid after the cell change or if a new key(s) is required to be acquired. In the case that a new key is needed, this can trigger the corresponding action(s) of requesting, receiving and/or updating the key.

In some embodiments, after changing its serving cell, the wireless device can continue using the encryption key. In other embodiments, a new key needs to be acquired for the new cell after the serving cell change. In another embodiment, a network node (e.g. base station or LMF) determines that there is a serving cell change for the wireless device and determines whether the key is still valid or a new key needs to be provided and triggers the corresponding action (providing the updated/new key or triggering the corresponding action in the LMF).

In some embodiments, the positioning integrity assistance information can be modified in accordance with a different integrity level depending on the type of positioning service, and/or a requirement of secure delivery of positioning integrity assistance information.

It will be appreciated that one or more of the above steps can be performed simultaneously and/or in a different order. Also, steps illustrated in dashed lines are optional and can be omitted in some embodiments.

Figure 7:
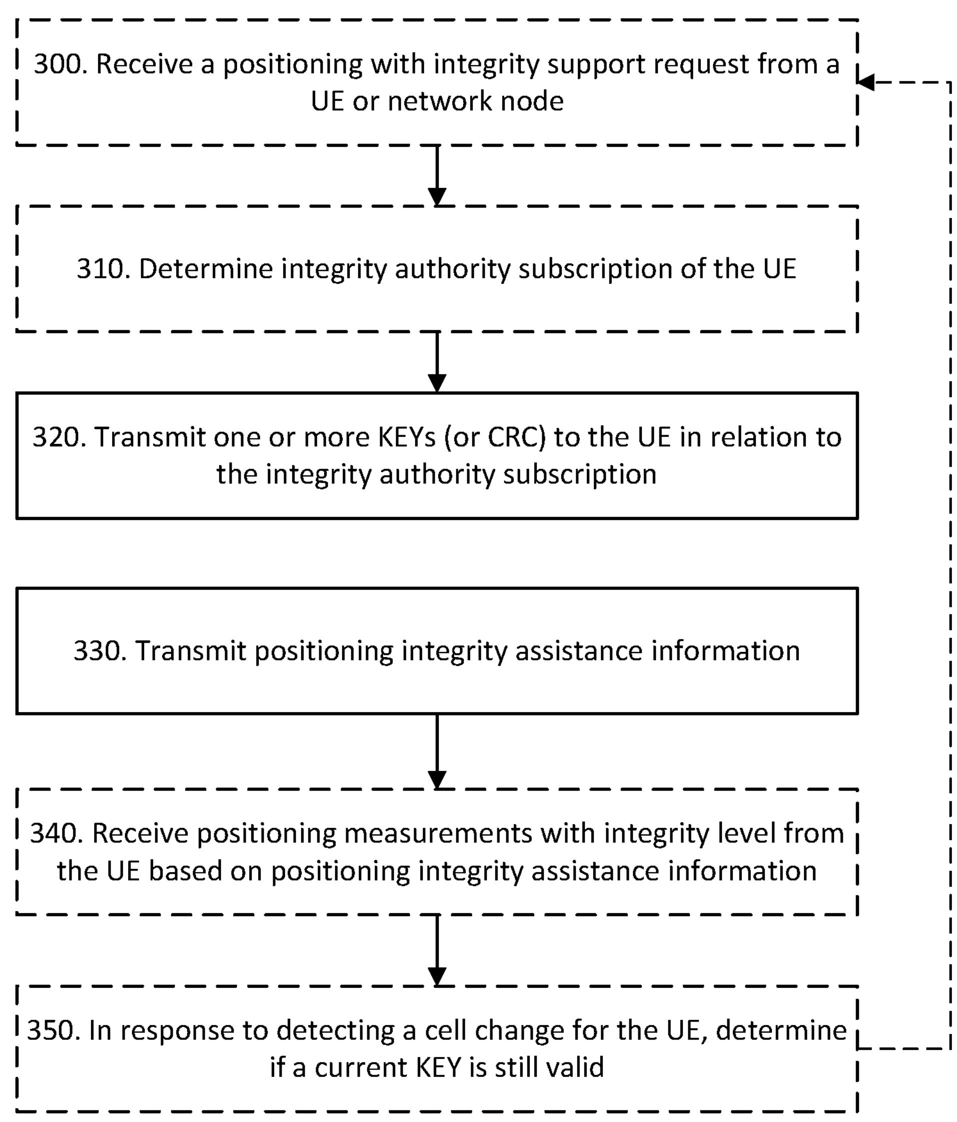
FIG. 7 is a flow chart illustrating a method which can be performed in a network node.

FIG. 7 is a flow chart illustrating a method which can be performed in a network node 130 as described herein. Network node 130 can be a location server 130 or another core network node such as an AMF, LMF, etc. The method can include:

Step 300: Optionally, the node receives a positioning with integrity support request from a wireless device, an access node (e.g. base station) or another network node.

Step 310: Optionally, the node checks/determines the integrity authority subscription of the wireless device. In some embodiments, the node can also check the indicated interest to determine the part(s) or level(s) of the positioning integrity information to be provided to the wireless device (e.g. determining at least one group in which the device will be receiving group-specific positioning integrity information).

Step 320: The node generates and transmits one or more keys to the wireless device in relation to the integrity authority subscription. In some embodiments, the key is configured to decode positioning integrity assistance information.

In alternative embodiments, the node can generate a CRC associated with at least a part of the positioning integrity assistance information. The generated CRC can be provided to the wireless device.

Step 330: The node transmits positioning integrity assistance information, at least a part of which can be encrypted. In some embodiments, the network node can transmit the assistance information to an access node such as gNB 120. In some embodiments, the network node can encrypt the positioning integrity assistance information prior to transmission.

Step 340: The node can receive positioning measurements with an associated integrity level from the wireless device. This can be based on broadcasted integrity positioning information.

Step 350: In an optional embodiment, responsive to identifying/determining a cell change for the wireless device, determining whether a current key is valid or a new/updated key is required. If a new/updated key is required, the node can provide the key to the wireless device or can trigger the corresponding action in the LMF or other node(s).

In some embodiments, the positioning integrity assistance information can be modified in accordance with a different integrity level depending on the type of positioning service, and/or a requirement of secure delivery of positioning integrity assistance information.

It will be appreciated that in some embodiments, the node 130 can communicate (e.g. transmit/receive messages) directly with a wireless device 110. In other embodiments, messages and signals between the entities may be communicated via other nodes, such as radio access node(s) (e.g. gNB, eNB) 120.

It will be appreciated that one or more of the above steps can be performed simultaneously and/or in a different order. Also, steps illustrated in dashed lines are optional and can be omitted in some embodiments.

Figure 8:
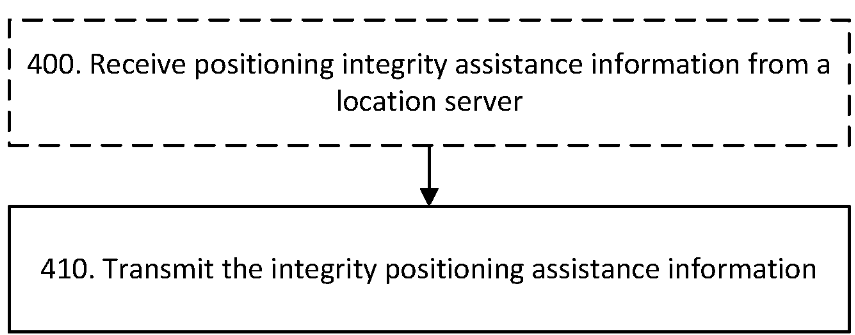
FIG. 8 is a flow chart illustrating a method which can be performed in an access node.

FIG. 8 is a flow chart illustrating a method which can be performed in a network node 120 as described herein. Network node 120 can be a radio access node 120 (base station, eNB, gNB). The method can include:

Step 400: Optionally, the access node receives positioning integrity assistance information from a network node such as a location server.

Step 410: The access node transmits the positioning integrity assistance information to one or more wireless devices. Optionally, the access node broadcasts the positioning integrity assistance information. In some embodiments, if the positioning integrity information is targeting a subset of wireless devices, then the integrity positioning information can be multicast. In other embodiments, where the positioning integrity information is device-specific, the integrity positioning information can be unicast.

In some embodiments, part or all of the positioning integrity assistance information can be encrypted.

It will be appreciated that one or more of the above steps can be performed simultaneously and/or in a different order. Also, steps illustrated in dashed lines are optional and can be omitted in some embodiments.

Integrity may play an important role in use cases related to positioning in Ultra Reliable Low Latency Communication (URLLC) including V2X, autonomous driving, UAV (drones), eHealth, Rail and Maritime, emergency and mission critical scenarios. Also, in use cases in which large errors can lead to serious consequences such as wrong legal decisions or wrong charge computation, integrity level of the positioning estimation may provide a good assessment on the reliability of the system and the network.

There are a number of ways to deliver integrity KPIs from the location server to the device, and the confidentiality of the KPIs should be ensured during the process. With reference to FIG. 1, it can be assumed that the LMF, AMF and gNB are located in trusted sites. Trusted sites are assumed to not leak keys, KPIs or other sensitive information to subscribers that the subscribers should not have access to. Furthermore, trusted sites are connected by confidentiality protected links. The confidentiality protection could be provided using encryption, physical protection or other means.

It is predictable that due to the nature of these use-cases and the demand of integrity assistance information from many UEs in the network, a network operator may decide on broadcasting this assistance information via System Information Block (SIB) messaging in radio resource control (RRC) signaling.

Reasons for encrypting the integrity positioning assistance information SIBs include:

1) For access control (i.e. only subscribers paying for the data should receive it). To enforce access control, the data is encrypted so that it can be decrypted by those UEs that have the correct access rights. This can be achieved by providing the UEs with appropriate decryption keys. A part of the data can be encrypted using a specific key. The network provides the UEs that should have access to that part of the data with the specific key.
2) The data is considered as sensitive. Due to sensitivity of the use cases and the legal matters which may be caused due to availability of this information, the networks may consider this as sensitive data and may not want to share it with UEs that have not been granted the access rights.

There is a positioning SIB defined in NR Release 15 which is set to broadcast RTK GNSS assistance information. In some embodiments, the integrity assistance information and KPIs can be broadcasted within this same SIB. In other embodiments, there can be a separate SIB defined explicitly for this information.

There is a positioning SIB defined in NR Release 15 which is set to broadcast RTK GNSS assistance information. In some embodiments, the integrity assistance information and KPIs can be broadcasted within the same SIB. In other embodiments, there can be a separate SIB defined explicitly for this information.

The integrity assistance information can be for RAT-based (e.g. OTDOA) or RAT-independent based (e.g. RTK GNSS) methods.

For GNSS assistance data, the specific request can concern the different satellite system, atmospheric corrections in the ionosphere and/or troposphere, ephemeris, clock corrections and almanac, reference time and position, the type of corrections such as differential GNSS relating to GNSS code phase measurement, RTK corrections relating to GNSS carrier phase measurements, precise point positioning (PPP) corrections relating to detailed satellite orbit trajectories and/or clock offsets, etc. The integrity KPIs such as AL, PL, and IR have been defined for GNSS satellites and therefore introducing these KPIs as additional information to the current SIB may correspond to adding another few integrity columns for each parameter in the positioning SIB.

In the specific case of DL-TDOA or UL-TDOA, the integrity assistance data, the information may concern the positioning reference signals, coordinates of the base stations or transmission points, network synchronization information, etc.

Some of the assistance data can be semi-static, while other parts of the assistance data is dynamic. Therefore, a UE can also request a certain update rate for the dynamic data for the integrity assessment.

It will be appreciated that, when using the term UE, this can be a wireless device or a wireless device in combination with an authentication module. Examples of authentication modules are Universal Integrated Circuit Card (UICC) and Universal Subscriber Identity Module (USIM). Key derivations may be performed completely in the wireless device, completely in the authentication module, or partially performed in the wireless device and partially performed in the authentication module.

In some embodiments, the target device can either have the key for decrypting the whole data or one or more keys for decrypting (e.g. different) parts of the data according to its subscription access authorities.

In some embodiments, the encryption procedure is preferably transparent to the network node (i.e. base station) and the information will be encrypted and decrypted at the location server and the target device respectively.

For the purpose of this disclosure and in 3GPP specifications, the terms ciphering and encryption will be treated as synonymous.

The keys can also subject to an expiration time, which means that the UE may need to renew keys once they have expired. The key renewal procedure can be the same as the procedure used to retrieve the initial keys.

The AMF can be the responsible core node to assign integrity keys to the UEs. It can check the subscription level of the UE and provide the proper encryption key to the UE for the corresponding SIB.

The LMF can generate the keys while handing over the keys to AMF to be distributed to the UEs and also encrypting the integrity assistance information which can be sent to the gNBs via NRPPa.

Emergency Location Handling

If a UE localization request originates from a third party, it can be the case that the target UE to be localized has no authority subscription to the positioning integrity information. For instance, consider a situation where an emergency service dispatcher needs to localize the caller to dispatch the emergency service and has sent a request for UE positioning to the location server. The location server in this situation should be able to verify the target UE status of authority subscription to the positioning integrity information. In case the target UE has no authority subscription to the positioning integrity information, the location server will then report the target UE location along with an indication of low positioning integrity. If the target UE has authority subscription to the positioning integrity information, the location server will then report the target UE location along with an indication of high positioning integrity.

In one embodiment, once the LMF is notified by a UE or third party of emergency (for example from several UEs using establishment cause as "Emergency" during call setup), then the LMF provides the AD in that region without any ciphering. Further, the LMF can notify the corresponding gNB(s) to increase the broadcast frequency. The NRPPa message with periodicity and priority is extended to include "emergency" from LMF to gNB. Upon receiving such indication from the gNB, it will provide the broadcast content with the shortest periodicity as possible and prioritize the broadcast delivery.

Security Aspects

In some embodiments, the positioning integrity KPIs are protected all the way between the UE and the network node that distributes the positioning integrity KPIs. Said protection is at least one of encryption and integrity protection.

The UE and the node can negotiate security capabilities directly between themselves or via another node. The security capabilities are at least one of encryption algorithms supported and integrity protection algorithms supported.

The UE and the node can negotiate security parameters directly between themselves or via another node. The security parameters are at least one of encryption algorithm to use and integrity protection algorithms to use. Said negotiation of security parameters may be based on other protection measures already in place, e.g., if NAS/AS encryption or integrity protection is active or not.

Encryption algorithms can be symmetric algorithms like ones based on ChaCha20, AES, SNOW-3G, etc., or asymmetric algorithms like ones based on Elliptic curves, Edward curves, RSA, etc.

Integrity algorithms can be symmetric algorithms like ones based on HMAC, SHA-256, Poly1305, AES, SNOW-3G, etc., or asymmetric algorithms like ones based on Elliptic curves, Edward curves, RSA, etc. The integrity algorithms can produce security token(s) which could be called checksum, message authentication code, cryptographic checksum, hash, keyed hash, integrity value.

An example using checksum is provided below to provide end-to-end security protection between the LMF and the UE.

Data Transfer Via LPP

A checksum can be used for validation of the integrity content or the LPP message carrying integrity.

The sender can flag the use of a CRC/checksum for exchanging integrity information and, when message integrity has been applied, the LPP message is appended with a CRC check.

In one embodiment, the CRC can be generated using one of the parameters or combination of parameters.

CRC=Fucn (Transaction ID, Sequence Number, AckFlag)

For example:

Transaction ID: 0001

Sequence Number: 0010

Ack Flag: 0

The CRC checksum is calculated by using the last 2 bits from transaction ID and Sequence ID and one bit from the AckFlag.

Thus, the 5 bits checksum/CRC is used for this case: 01010

Another example calculation can be based upon the Integrity message content. For example, if the network has used 5 different fields then a simple CRC check is based upon including the last or first field's value as integrity checksum/CRC.

In another embodiment, when Integrity has been used, the receiver of the message may always provide an Ack to the sender when the message is received.

Embodiments described herein provide solutions for a network to provide positioning integrity support via broadcast in a secure way. By encrypting the integrity positioning broadcast data, it is possible to control the access of different UEs in using the broadcast data. It is possible to provide UEs with different positioning subscription advantages which can empower the network. The sensitive information from the network can remain secure.

The network can assist the device in terms of different environmental, network and service failures, which can lead to unreliable position estimations.

The device can evaluate among different parameters based on what is received from the network and its own setup and measurements to compute the integrity level of the position estimation.

The device can discriminate some problematic measurements or computations based on the assisted information received from the network in terms of integrity. The device can repeat some measurements in order to improve the integrity level of the positioning performance.

The device can have certain rules for hybrid positioning depending on the integrity conditions.

A secured LPP message transfer mechanism is provided in some embodiments.

It will be appreciated that some positioning-related messages (e.g. request, response, report, acknowledgement, etc.) could be mandated as part of the procedure in some implementations (i.e. not configurable), while in other implementations they can be configurable through signaling.

Figure 9:
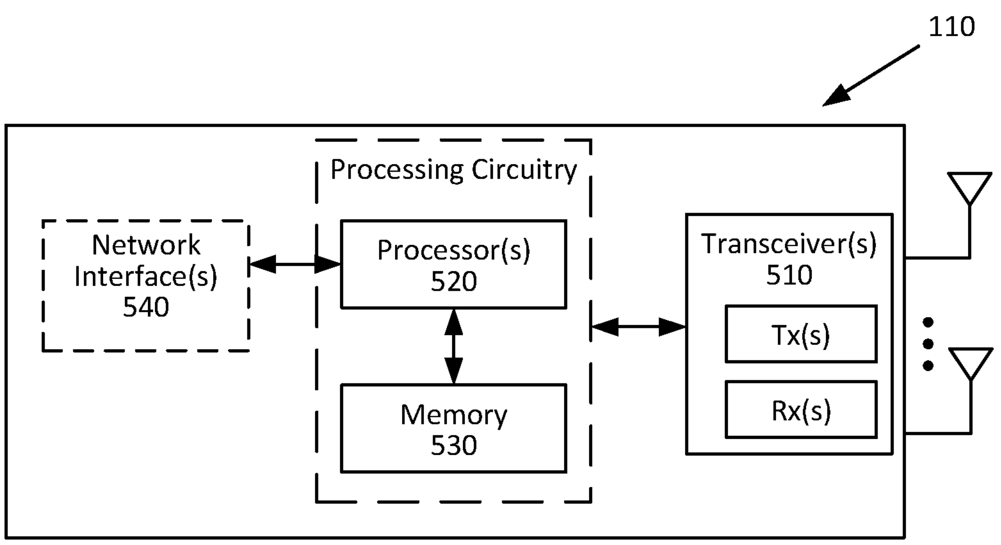
FIG. 9 is a block diagram of an example wireless device.

FIG. 9 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 9 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
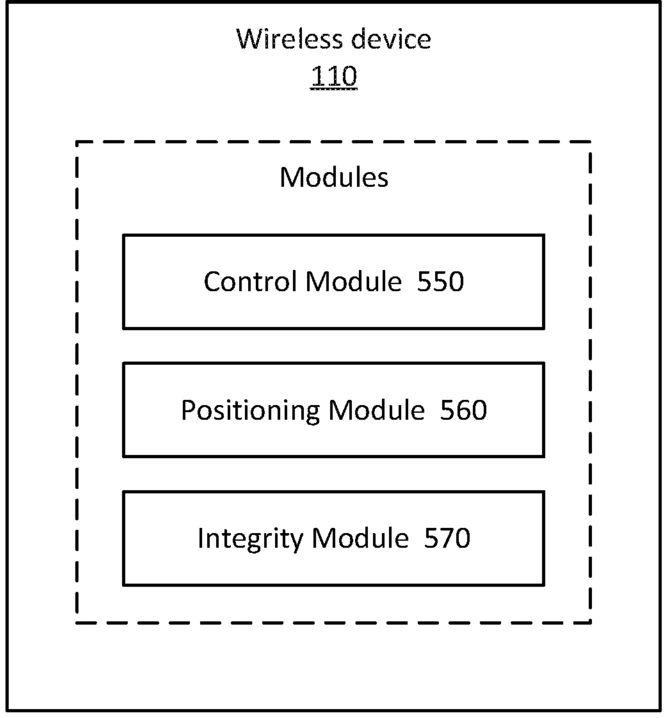
FIG. 10 is a block diagram of an example wireless device with modules

In some embodiments, the wireless device UE 110 may comprise a series of modules configured to implement the functionalities of the wireless device described above. Referring to FIG. 10, in some embodiments, the wireless device 110 may comprise a control module 550 for receiving and interpreting control/configuration/capability information, a positioning module 560 for performing positioning measurements and calculating an estimated position, and an integrity module 570 for monitoring and determining the integrity associated with the positioning measurements.

It will be appreciated that the various modules may be implemented as combination of hardware and software, for instance, the processor, memory and transceiver(s) of UE 110 shown in FIG. 9. Some embodiments may also include additional modules to support additional and/or optional functionalities.

Figure 11:
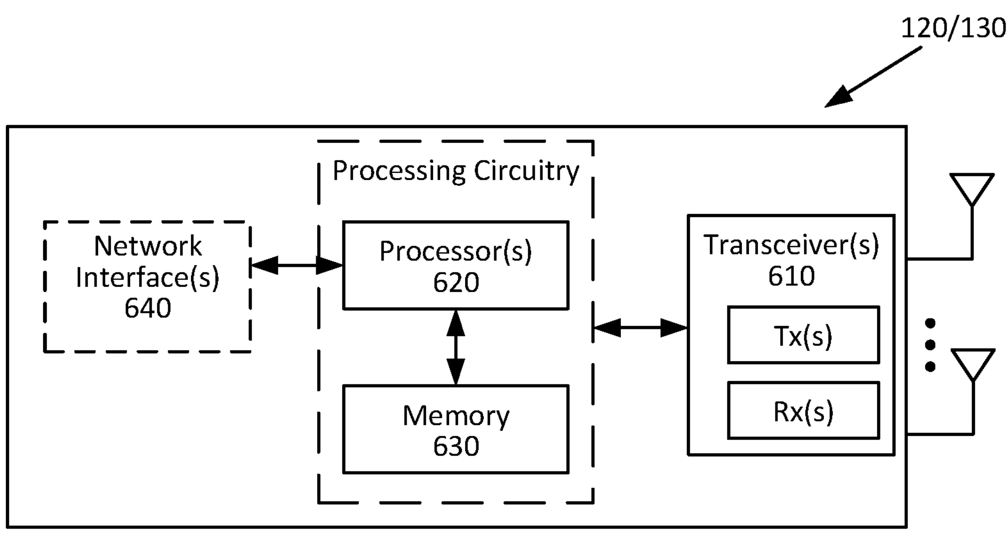
FIG. 11 is a block diagram of an example network node.

FIG. 11 is a block diagram of an exemplary network node 120/130. The exemplary node can be a location server 130 or an access node 120, in accordance with certain embodiments described herein. Network node 120/130 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by network node 120/130, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 120/130, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120/130, send output from node 120/130, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120/130 can include additional components beyond those shown in FIG. 11 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 11 may be included in other network nodes (such as UE 110, radio access node 120, etc.). Other network nodes may optionally include or not include a wireless interface (such as the transceiver described in FIG. 11).

Figure 12:
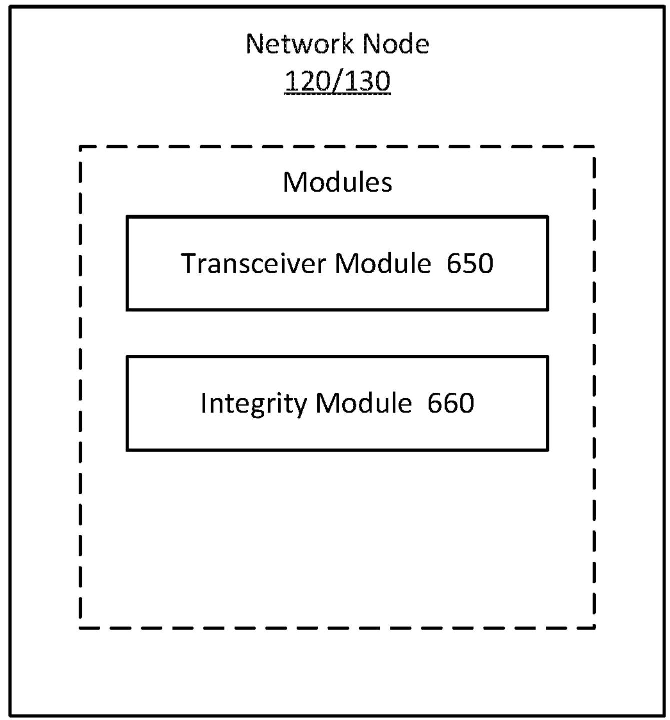
FIG. 12 is a block diagram of an example network node with modules.

In some embodiments, the network node 120/130, may comprise a series of modules configured to implement the functionalities of the network node described above. Referring to FIG. 12, in some embodiments, the network node 120/130 can comprise a transceiver module 650 for transmitting and receiving positioning-related messages, such as capability requests/responses, positioning information and reports, and an integrity module 660 for determining integrity-related parameter(s) associated with a device and for determining the integrity associated with an estimated position of the device.

It will be appreciated that the various modules may be implemented as combination of hardware and software, for instance, the processor, memory and transceiver(s) of network node 120/130 shown in FIG. 11. Some embodiments may also include additional modules to support additional and/or optional functionalities.

Figure 13:
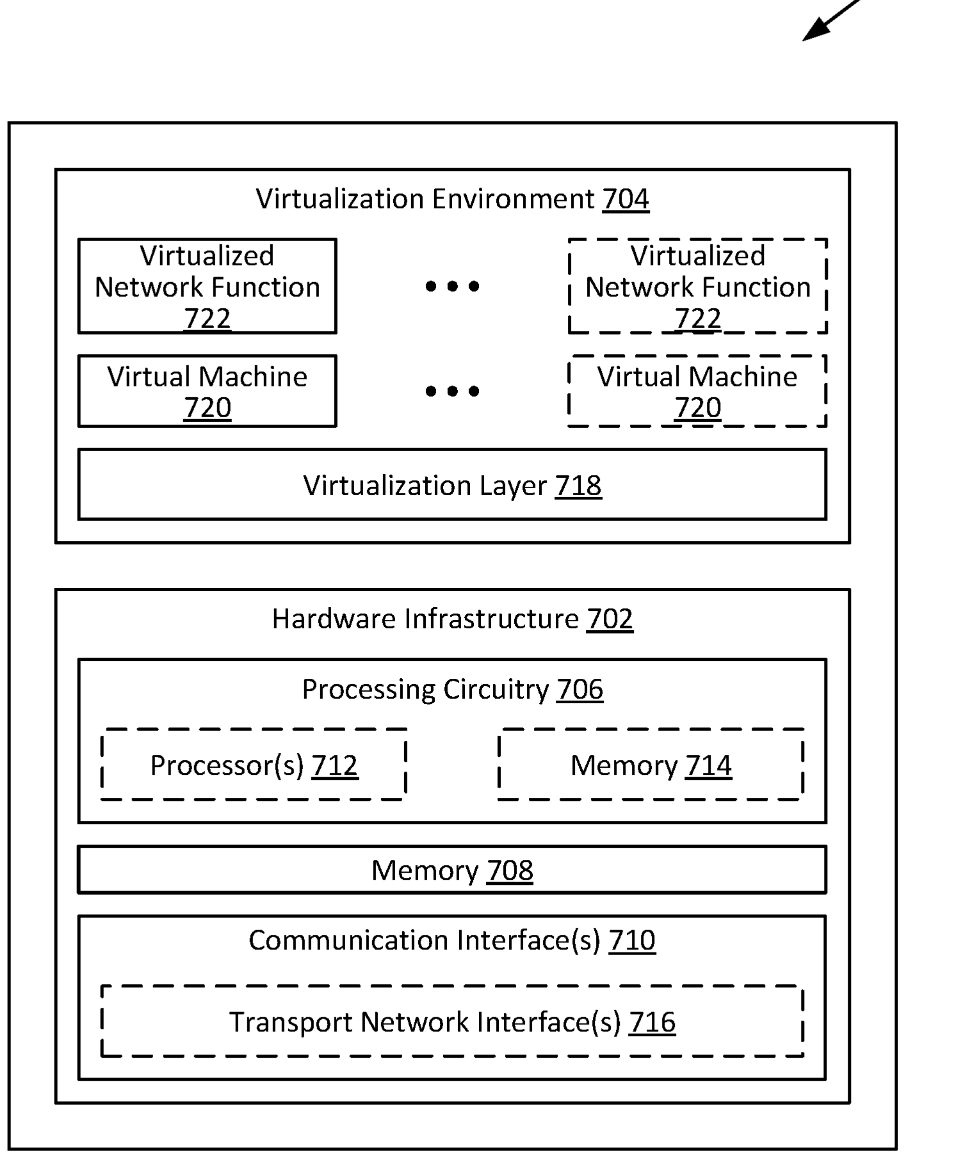
FIG. 13 is a block diagram of an example virtualized processing node.

Turning now to FIG. 13, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuity 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

3GPP Third Generation Partnership Project
ACK Acknowledgement
AP Access Point
ARQ Automatic Repeat Request
BS Base Station
BSC Base Station Controller
BSR Buffer Status Report
BTS Base Transceiver Station
CA Carrier Aggregation
CC Component Carrier
CCCH SDU Common Control Channel SDU
CG Configured Grant CGI Cell Global Identifier
CN Core Network
CQI Channel Quality information
CSI Channel State Information
CU Central Unit
DAS Distributed Antenna System
DC Dual Connectivity
DCCH Dedicated Control Channel
DCI Downlink Control Information
DL Downlink
DMRS Demodulation Reference Signal
DU Distributed Unit
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LCH Logical Channel
LTE Long-Term Evolution
M2M Machine to Machine
MAC Medium Access Control
MBMS Multimedia Broadcast Multicast Services
MCG Master Cell Group
MDT Minimization of Drive Tests
MeNB Master eNode B
MME Mobility Management Entity
MSC Mobile Switching Center
MSR Multi-standard Radio
MTC Machine Type Communication
NACK Negative Acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary Serving Cell
PSCell Primary SCell
PUCCH Physical Uplink Control Channel
PUSCH Physical Uplink Shared Channel
RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TB Transport Block
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-Vehicle
V2X Vehicle-to-Everything
WLAN Wireless Local Area Network

The invention claimed is:

1. A method performed by a wireless device, the method comprising:
- receiving, from a network node, a first key configured to decode positioning integrity assistance information;
- receiving encrypted positioning integrity assistance information, wherein the positioning integrity assistance information includes at least one integrity key performance indicator (KPI) for estimating an integrity level associated with an estimated position of the wireless device;
- decrypting the encrypted positioning integrity assistance information using the first key received from the network node; and
- performing positioning measurements using the decrypted positioning integrity assistance information, wherein performing positioning measurements includes:
  - determining the estimated position of the wireless device; and
  - estimating the integrity level associated with the estimated position in accordance with the decrypted positioning integrity assistance information.

2. The method of claim 1, wherein the encrypted positioning integrity assistance information is received via a broadcast message.

3. The method of claim 1, wherein the encrypted positioning integrity assistance information is received via an LTE Positioning Protocol (LPP) message.

4. The method of claim 3, wherein the LPP message includes cyclic redundancy check (CRC) information associated with the encrypted positioning integrity assistance information.

5. The method of claim 3, further comprising, computing a cyclic redundancy check (CRC) on the encrypted positioning integrity assistance information.

6. The method of claim 1, further comprising, receiving a non-encrypted part of the positioning integrity assistance information.

7. The method of claim 1, further comprising, responsive to detecting a cell change, determining a validity of the first key.

8. The method of claim 7, further comprising, responsive to determining that the first key is not valid, requesting a second key configured to decode positioning integrity assistance information.

9. The method of claim 1, further comprising, transmitting, to a network node, the estimated position of the wireless device.

10. The method of claim 1, further comprising, transmitting, to a network node, the integrity level associated with the estimated position of the wireless device.

11. The method of claim 1, wherein the positioning integrity assistance information is modified in accordance with at least one of: a different integrity level dependent on the type of positioning service, and a requirement of secure delivery of positioning integrity assistance information.

12. A wireless device comprising a radio interface and processing circuitry configured to:

receive, from a network node, a first key configured to decode positioning integrity assistance information;

receive encrypted positioning integrity assistance information, wherein the positioning integrity assistance information includes at least one integrity key performance indicator (KPI) for estimating an integrity level associated with an estimated position of the wireless device;

decrypt the encrypted positioning integrity assistance information using the first key received from the network node; and perform positioning measurements using the decrypted positioning integrity assistance information, wherein performing positioning measurement includes:

determining the estimated position of the wireless device; and estimating the integrity level associated with the estimated position in accordance with the decrypted positioning integrity assistance information.

13. The wireless device of claim 12, wherein the encrypted positioning integrity assistance information is received via a broadcast message.

14. The wireless device of claim 12, wherein the encrypted positioning integrity assistance information is received via an LTE Positioning Protocol (LPP) message.

15. The wireless device of claim 14, wherein the LPP message includes cyclic redundancy check (CRC) information associated with the encrypted positioning integrity assistance information.

16. The wireless device of claim 14, further configured to compute a cyclic redundancy check (CRC) on the encrypted positioning integrity assistance information.

17. The wireless device of claim 12, further configured to receive a non-encrypted part of the positioning integrity assistance information.

18. The wireless device of claim 12, further configured to, responsive to detecting a cell change, determine a validity of the first key.

19. The wireless device of claim 18, further configured to, responsive to determining that the first key is not valid, request a second key configured to decode positioning integrity assistance information.

20. The wireless device of claim 12, further configured to transmit, to a network node, the estimated position of the wireless device.

21. The wireless device of claim 12, further configured to transmit, to a network node, the integrity level associated with the estimated position of the wireless device.

22. The wireless device of claim 12, wherein the positioning integrity assistance information is modified in accordance with at least one of: a different integrity level dependent on the type of positioning service, and a requirement of secure delivery of positioning integrity assistance information.

* * * * *